United States Patent
Takano et al.

(10) Patent No.: US 8,872,491 B2
(45) Date of Patent: Oct. 28, 2014

(54) REGULATOR AND DC/DC CONVERTER

(75) Inventors: Yoichi Takano, Tokyo (JP); Naofumi Sato, Tokyo (JP)

(73) Assignee: Mitsumi Electric Co., Ltd, Tokyo (JP)

( * ) Notice: Subject to any disclaimer, the term of this patent is extended or adjusted under 35 U.S.C. 154(b) by 562 days.

(21) Appl. No.: 13/221,101

(22) Filed: Aug. 30, 2011

(65) Prior Publication Data

US 2012/0062198 A1    Mar. 15, 2012

(30) Foreign Application Priority Data

Sep. 9, 2010 (JP) ................................ 2010-202131

(51) Int. Cl.
*G05F 1/569* (2006.01)
*G05F 1/571* (2006.01)
*G05F 1/565* (2006.01)
*H02M 1/36* (2007.01)

(52) U.S. Cl.
CPC *H02M 1/36* (2013.01); *G05F 1/565* (2013.01)
USPC .......................................................... 323/276

(58) Field of Classification Search
USPC .................... 323/276, 281, 284–285
See application file for complete search history.

(56) References Cited

U.S. PATENT DOCUMENTS

| 6,525,517 B1 * | 2/2003 | Hojo et al. ..................... 323/316 |
| 7,088,078 B2 * | 8/2006 | Liu ............................... 323/207 |
| 2004/0032754 A1 * | 2/2004 | Yang .......................... 363/56.09 |
| 2011/0009171 A1 * | 1/2011 | Watanabe et al. ............. 323/273 |

FOREIGN PATENT DOCUMENTS

| JP | 2005-327027 A | 11/2005 |
| JP | 2007-336744 A | 12/2007 |
| JP | 2010-015471 A | 1/2010 |

* cited by examiner

*Primary Examiner* — Jue Zhang
(74) *Attorney, Agent, or Firm* — Washida IP Group, LLC

(57) ABSTRACT

A regulator and a DC/DC converter are provided in which a soft start is carried out even when an output is short-circuited by abnormality. Regulator includes soft start circuit that gradually starts up a reference voltage that is input into error amplifier from 0 V to the reference voltage and soft start reset circuit that monitors an input of error amplifier and performs soft start of soft start circuit again when an output of output terminal Vo is short-circuited. Soft start reset circuit includes comparator that is disposed in parallel with an input of error amplifier, offset voltage that gives an offset to the input of comparator, and NPN transistor that is turned on or off in accordance with a result of comparison of comparator and discharges capacitor C by being turned on when the output is short-circuited.

9 Claims, 18 Drawing Sheets

REGULATOR AND DC/DC CONVERTER

CROSS REFERENCE TO RELATED APPLICATIONS

This application is entitled to and claims the benefit of Japanese Patent Application No. 2010-202131, filed on Sep. 9, 2010, the disclosure of which including the specification, drawings and abstract is incorporated herein by reference in its entirety.

TECHNICAL FIELD

The present invention relates to a regulator and a DC/DC converter that are used in a power supply device or the like of an electronic apparatus.

BACKGROUND ART

As a power supply of an electronic apparatus, a series regulator, a switching regulator, or a DC/DC converter is used. For example, a series regulator is structured by using a feedback amplifier having a reference voltage input terminal to which a reference voltage is input, a feedback input terminal to which an output is input via a feedback gain, and an output terminal section.

The regulator or the DC/DC converter performs feedback control that compares between the output voltage and the reference voltage by using an error amplifier so as to let the output voltage be within a predetermined range.

Also, the output of the reference voltage of the reference voltage circuit of the regulator is sharply started up when the power supply is energized. For this reason, an excessive overshoot appears in the output of the regulator. Therefore, some regulators have a soft start function that controls the output voltage during the starting-up period until the output voltage is completely started up. The soft start function controls a gradient exhibiting a voltage change in a process from a state in which the output voltage is 0 V until the output voltage is started up to a predetermined voltage, in order to reduce a rush current and to alleviate the overshoot at the time of starting-up of the output voltage of the regulator or the DC/DC converter.

Patent literature 1 discloses an overshoot control circuit for a voltage regulator that supplies a gate voltage needed to maintain a constant output voltage to an output transistor by an error amplifier that compares a reference voltage with an output voltage subjected to voltage division by a feedback resistor wherein a CR circuit is provided to an output of the aforesaid reference voltage.

Patent literature 2 discloses a power supply circuit and a power supply apparatus having a soft start control section that detects an input of a first soft start voltage, outputs a first soft start voltage when a soft start function control signal is on, and outputs a second soft start voltage having a gradient different from that of the first soft start voltage when the soft start function control signal is off.

FIG. 1 is a circuit diagram of a regulator having a soft start function.

Referring to FIG. 1, regulator 10 includes power supply voltage input terminal Vin, control voltage input terminal Vcont, connection terminal Cs for connecting externally attached capacitor C, output transistor Q1, bias circuit 11, reference voltage circuit 12, CR circuit 13, error amplifier 14, voltage-division resistors R1 and R2, output voltage Vout output terminal Vo, and output capacitor Cout.

CR circuit 13 is made of resistor R and externally attached capacitor C that are inserted between error amplifier 14 and the reference voltage. CR circuit 13 realizes the soft start by allowing the starting-up of the reference voltage at the time of energizing the power supply to have a CR time constant. CR circuit 13 constitutes a soft start circuit that alleviates the overshoot of the output voltage by gradually raising the reference voltage output and preventing a rush current that charges up output capacitor Cout when the power supply is energized. Here, capacitor C may be incorporated within regulator 10.

Output transistor Q1 is connected between power supply voltage input terminal Vin and output voltage Vout output terminal Vo, and output capacitor Cout is connected to output voltage Vout output terminal Vo. Output capacitor Cout is a stabilizing capacitance for phase correction and noise removal.

Output voltage Vout is subjected to voltage division through resistors R1 and R2, and a feedback voltage drawn out from a connection middle point thereof is connected to a non-inverting input terminal of error amplifier 14.

Error amplifier 14 is specifically made of an operation amplifier, where a feedback voltage obtained by voltage division of output voltage Vout by resistors R1 and R2 is input to the non-inverting input terminal, and the reference voltage is input to an inverting input terminal via CR circuit 13. Error amplifier 14 performs voltage feedback by supplying an output voltage that accords to a difference between the feedback voltage and the reference voltage to a gate of output transistor Q1, whereby the output voltage of regulator 10 is maintained to be a constant voltage.

In the above-described structure, regulator 10 gradually starts up the input and output of the error amplifier by the CR time constant connected to the reference voltage. This can reduce an amount of overshoot of regulator 10 output at the time of energizing the power supply.

PATENT LITERATURE

PTL 1: Japanese Patent Application Laid-Open No. 2005-327027

PTL 2: Japanese Patent Application Laid-Open No. 2007-336744

However, in a regulator having a conventional soft start function such as described above, a rush current flows and an overshoot is generated in the output voltage when the soft start function does not work due to some abnormality.

A case in which the soft start function does not work by abnormality will be described.

FIGS. 2 to 4 are each a view showing a case in which the soft start function does not work.

Referring to FIG. 2, power supply set 20 includes regulator 10 and supplies electric power to externally connected device 30 such as a USB or an SD card via a connection connector for the USB or the SD card not illustrated in the drawings.

There are cases in which externally connected device 30 connected to the outside of power supply set 20 is destroyed by erroneous insertion of externally connected device 30 or short-circuit caused by connection connector abnormality.

Referring to FIG. 3, power supply set 20A includes regulator 10 and high-side switch 21 or the like that controls the output voltage of regulator 10, and supplies electric power to externally connected device 30 such as a USB or an SD card via a connection connector for the USB or the SD card not illustrated in the drawings.

There are cases in which high-side switch 21 or the like inside power supply set 20A is destroyed by erroneous insertion of externally connected device 30 connected to the outside of power supply set 20A or short-circuit caused by connection connector abnormality.

Because the erroneous insertion of externally connected device 30 or short-circuit caused by connection connector abnormality is an abnormality after starting-up of the output voltage, the soft start function does not work.

Also, as shown in FIG. 4, there are cases in which, when an abnormal short-circuit such as testing is present within the power supply set, connection device 30A connected to regulator 10 may be destroyed.

FIGS. 5A-5E are a waveform diagram of each terminal when a short-circuit test of short-circuiting output voltage Vout is carried out on regulator 10 of FIG. 1. The inside of a broken line in FIGS. 5D and 5E shows a short circuit test.

Referring to FIGS. 5A-5C, regulator 10 gradually starts up the input and output of error amplifier 14 by the CR time constant connected to the reference voltage.

When a short-circuit of output is present by some abnormality and restoration is desired after the output voltage is started up, the soft start is not carried out because externally attached capacitor C connected to connection terminal Cs is kept being charged.

Referring to FIG. 5E, by the short-circuit test, a rush current is generated, whereby an overshoot is generated in the output voltage (see FIG. 5D).

There are cases in which, when the above-described rush current is generated, deficiency in starting may occur due to insufficient electric current capability of a former stage of the regulator. Also, there are cases in which, when the overshoot is generated, elements located in a stage subsequent to the regulator may be destroyed by overvoltage breakdown.

An object of the present invention is to provide a regulator and a DC/DC converter in which a soft start is carried out even when an output is short-circuited by abnormality.

SUMMARY OF THE INVENTION

In order to achieve the aforementioned object, the regulator of the present invention adopts a structure including an error amplifier that compares a reference voltage with a feedback voltage obtained by voltage division of a voltage of an output terminal and outputs a voltage that accords to an error; a soft start circuit that gradually starts up the reference voltage that is input into said error amplifier; and a soft start reset circuit that monitors an input of said error amplifier and performs soft start of said soft start circuit again when an output of said output terminal is short-circuited.

The DC/DC converter of the present invention adopts a structure including the above-described regulator.

According to the present invention, it is possible to realize a regulator and a DC/DC converter in which a soft start is carried out even when an output is short-circuited by abnormality after starting-up of the output voltage, such as erroneous insertion of an externally connected device or short-circuit caused by connection connector abnormality.

DESCRIPTION OF EMBODIMENTS

Hereinafter, embodiments of the present invention will be described in detail by making reference to the attached drawings.

(Embodiment 1)

Figure 1:
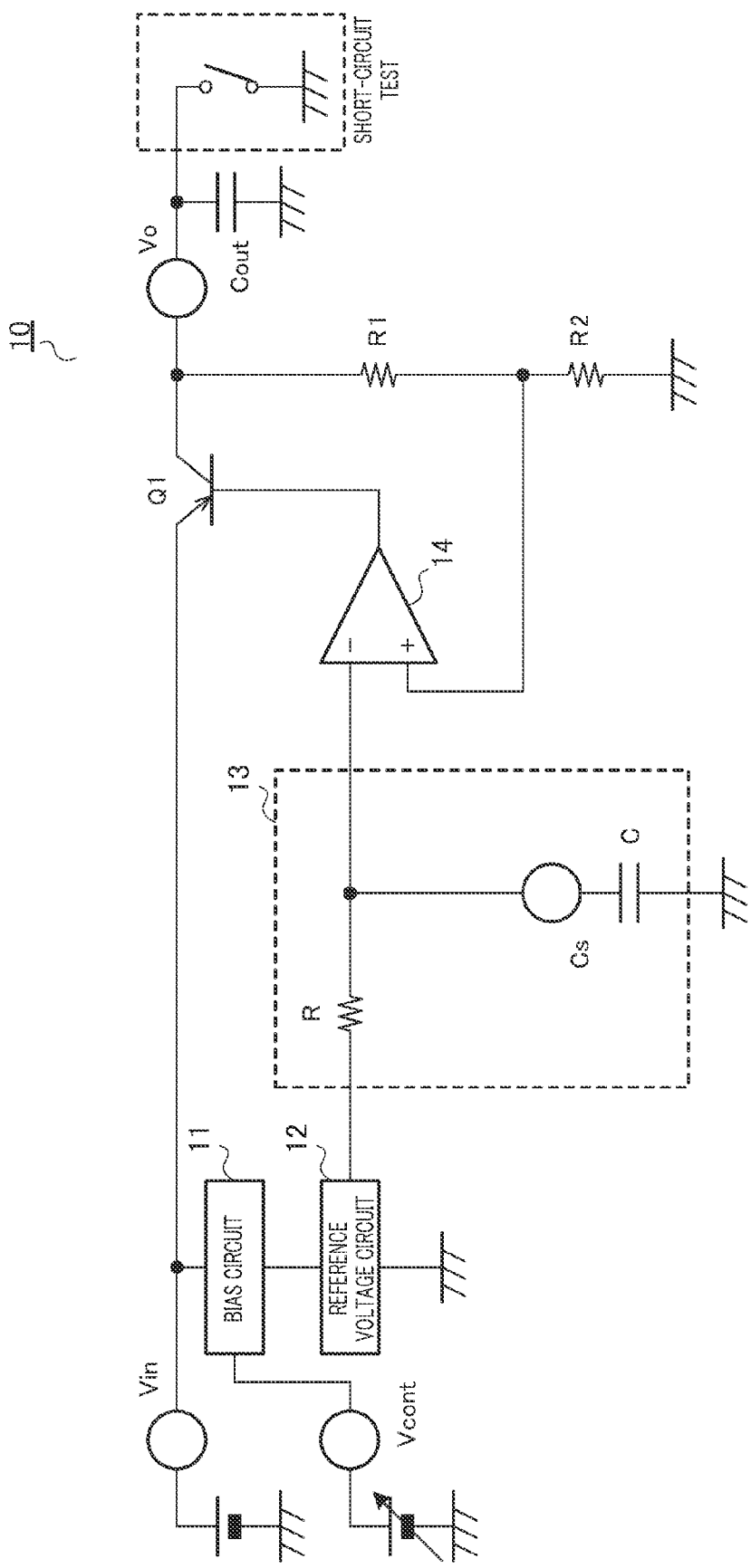
FIG. 1 is a circuit diagram of a regulator having a conventional soft start function.
Figure 6:
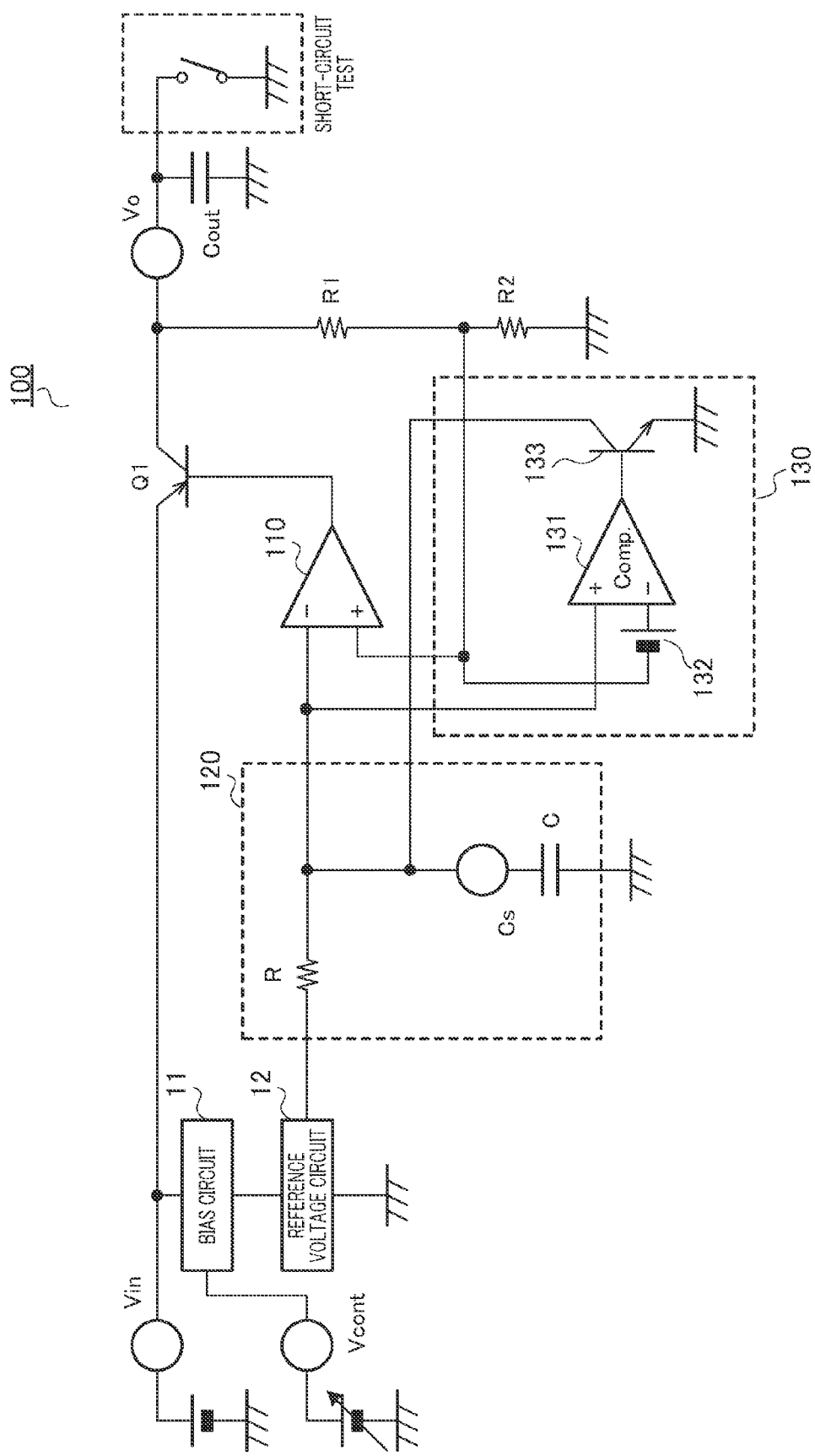
FIG. 6 is a circuit diagram illustrating a structure of a regulator having a soft start function according to Embodiment 1 of the present invention.

FIG. 6 is a circuit diagram illustrating a structure of a regulator having a soft start function according to Embodiment 1 of the present invention. The present embodiment is an example applied to a series regulator. In describing the present embodiment, constituent elements similar to those appearing in FIG. 1 are denoted with similar reference signs.

Referring to FIG. 6, regulator 100 includes power supply voltage input terminal Vin, control voltage input terminal Vcont, resistor R, connection terminal Cs for connecting externally attached capacitor C, output transistor Q1, bias circuit 11, reference voltage circuit 12, error amplifier 110, soft start circuit 120, soft start reset circuit 130, voltage-division resistors R1 and R2, output voltage Vout output terminal Vo, and output capacitor Cout.

Output transistor Q1 is connected between power supply voltage input terminal Vin and output voltage output terminal Vo and outputs a constant output voltage by being turned on or off by receiving an output of error amplifier 110 at a gate thereof. Output capacitor Cout is connected to output voltage output terminal Vo. Output capacitor Cout is a stabilizing capacitance for phase correction and noise removal.

Output voltage Vout is subjected to voltage division through resistors R1 and R2, and a feedback voltage drawn out from a connection middle point thereof is connected to non-inverting input terminal (+) of error amplifier 110.

Error amplifier 110 compares the reference voltage with the feedback voltage obtained by voltage division of the voltage of the output terminal and outputs a voltage that accords to an error. Error amplifier 110 is specifically made of an operation amplifier, where the feedback voltage obtained by voltage division of output voltage Vout with resistors R1 and R2 is input to non-inverting input terminal (+), and the reference voltage is input to inverting input terminal (−) via soft start circuit 120. Error amplifier 110 performs voltage feedback by supplying an output voltage that accords to the difference between the feedback voltage and the reference voltage to the gate of output transistor Q1, whereby output voltage Vout of regulator 100 is maintained to be a constant voltage. In error amplifier 110, the input and the output have an almost equal electrical potential at the time of starting up and at the time of normal operation. For this reason, the comparator with an offset remains being turned off and does not affect the normal operation.

Soft start circuit 120 gradually starts up (i.e. moderately raises) the reference voltage that is input into error amplifier 110, from 0 V to the reference voltage. Soft start circuit 120 gradually raises the reference voltage output that is supplied to error amplifier 110, and alleviates the overshoot of output voltage Vout by preventing the rush current that charges up output capacitor Cout at the time of energizing the power supply. Specifically, soft start circuit 120 is a CR circuit that is inserted between error amplifier 110 and the reference voltage and made of resistor R and externally attached capacitor C. Soft start circuit 120 realizes a soft start by allowing the start-up of the reference voltage at the time of energizing the power supply to have a CR time constant.

In the meantime, when the inside of regulator 100 is provided with a CR circuit that the regulator does not inherently have, the circuit size will be large. Namely, because the starting-up of the reference voltage is allowed to have a CR time constant, there is a need to ensure the time constant to a certain degree, so that the size of resistor R and capacitor C constituting the CR circuit will be large. When it is attempted to form this in the inside of regulator 100, the flexibility of time constant setting may be poor in relation to the chip size. Therefore, it is so structured that capacitor C constituting the CR circuit is externally attached to connection terminal Cs.

Here, upon giving the above consideration, regulator 100 may be structured so that capacitor C is incorporated within regulator 100 (see later mentioned FIG. 16).

Also, a soft start circuit that does not use a CR time constant will be described later by way of Embodiment 2.

Soft start reset circuit 130 monitors the input of error amplifier 110 and performs soft start of soft start circuit 120 again at the time of output short-circuit of output terminal Vo. Soft start reset circuit 130 is connected in parallel to error amplifier 110 and resets soft start circuit 120 at the time of output short-circuit.

Soft start reset circuit 130 includes comparator 131 disposed in parallel to the input of error amplifier 110, offset voltage 132 that gives an offset to the input of comparator 131, and NPN transistor 133 that is turned on or off in accordance with a comparison result of comparator 131 and discharges capacitor C by being turned on at the time of output short-circuit.

Comparator 131 compares between the reference voltage that is input into error amplifier 110 via soft start circuit 120 and a voltage obtained by superposing offset voltage 132 on the feedback voltage obtained by voltage division of output voltage Vout with resistors R1 and R2, and controls turning on or off of NPN transistor 133 in accordance with a comparison result. Comparator 131 compares between the output of soft start circuit 120 (inverting input terminal of error amplifier 110) and the voltage obtained by superposing offset voltage 132 on the feedback voltage obtained by voltage division of output voltage Vout with resistors R1 and R2 (non-inverting input terminal of error amplifier 110).

Comparator 131 is turned off because the input is within the offset voltage at the time of starting-up of the soft start and at the time of stationary state, thereby turning NPN transistor 133 off. Also, comparator 131 is turned on because the input exceeds the offset voltage at the time of output short-circuit, thereby turning NPN transistor 133 on.

Offset voltage 132 constitutes comparator 131 with an offset by giving an input offset to the feedback voltage obtained by voltage division of output voltage Vout with resistors R1 and R2. Offset voltage 132 is, for example, several tens of mV. Offset voltage 132 is provided for the following two purposes:

(1) to prevent an erroneous operation by change in the load or by transient response to the load, and (2) to prevent comparator 131 from operating at an ordinary time. When the offset is absent, comparator 131 will always be in operation, so that the comparator 131 input is set to be a little lower by the offset. At the time of starting up and at the time of normal operation, error amplifier 100 will have an almost equal electrical potential, so that comparator 131 with the offset remains being off and does not affect the normal operation.

In NPN transistor 133, the collector thereof is connected to a connection point between resistor R and externally attached capacitor C of soft start circuit 120 (CR circuit); the emitter thereof is grounded, and the base thereof is connected to the output of comparator 131. When a voltage higher than a predetermined value is applied to the base of NPN transistor 133 from comparator 131, NPN transistor 133 is turned on to set the electrical potential of connection terminal Cs to be generally the GND level. This discharges the electric charge of externally attached capacitor C connected to connection terminal Cs.

Hereinafter, an operation of regulator 100 structured as shown above will be described.

Figure 7:
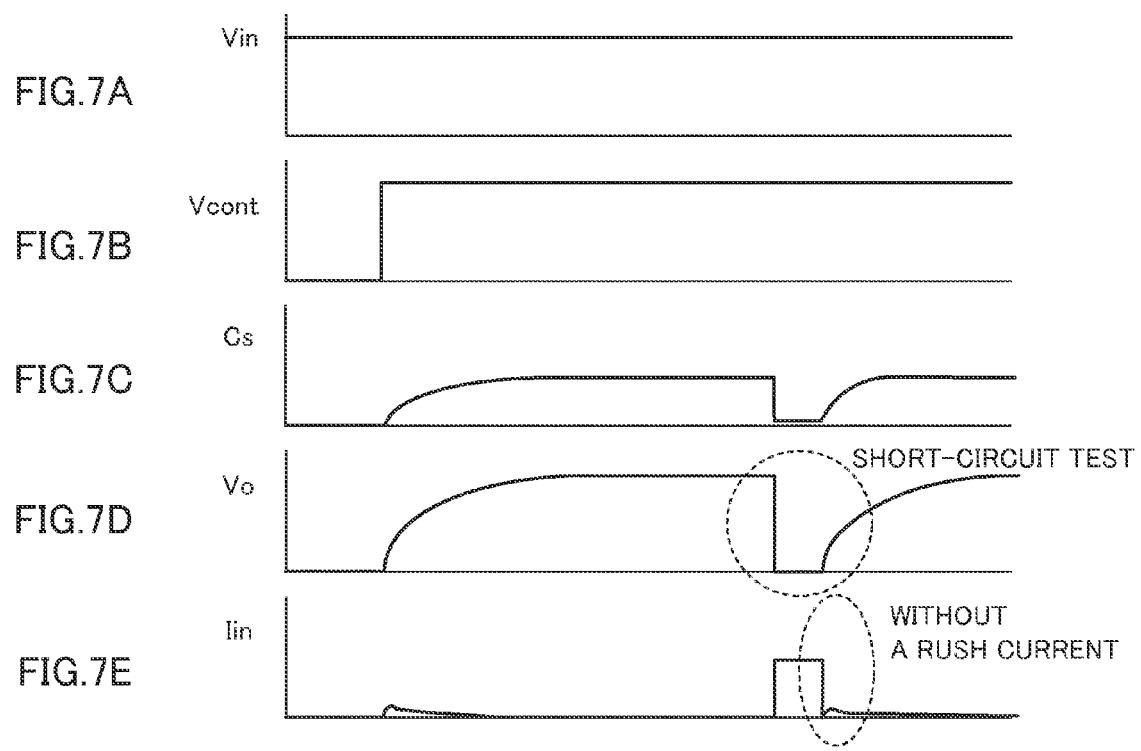
FIGS. 7A-7E are a waveform diagram of each terminal when a short-circuit test of short-circuiting the output voltage is carried out on the regulator of Embodiment 1 described above.

FIG. 7 is a waveform diagram of each terminal when a short-circuit test of short-circuiting output voltage Vout is carried out on regulator 100.

Referring to FIGS. 7A, 7B, when a power supply voltage is applied to power supply voltage input terminal Vin, the applied power supply voltage is supplied to reference voltage circuit 12 via bias circuit 11. Reference voltage circuit 12 outputs a reference voltage that follows the applied power supply voltage. When a sharp power supply voltage is applied to power supply voltage input terminal Vin, the reference voltage output also will be started up by following the power supply voltage.

Referring to FIG. 7C, soft start circuit 120 gradually raises the reference voltage output supplied to error amplifier 110 by the CR time constant, and alleviates the overshoot of output voltage Vout of regulator 100.

After the soft start is started up, regulator 100 proceeds to a regulator operation mode in which the output is output to output voltage output terminal Vo. Here, regulator operation mode is referred to as an LDO (Low Drop Out) mode.

By the soft start, the reference voltage is attained, for example, at a time point after several milliseconds have passed. Error amplifier 110 operates so that the feedback voltage obtained by voltage division of output voltage Vout with resistors R1 and R2 will be equal to the reference voltage (imaginary short-circuited state). This can not only prevent excessive electric current from flowing through the load even immediately after the starting-up of the power supply voltage but also supply output voltage Vout stably even if fluctuation is present in the state of the load after the operation is started.

Figure 2:
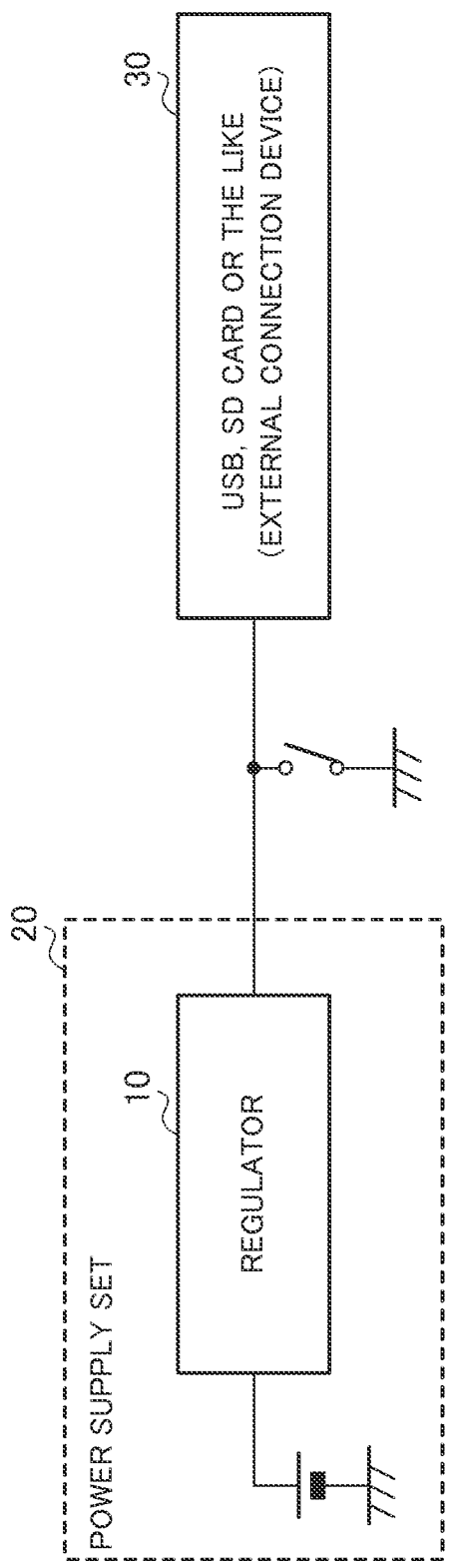
FIG. 2 is a view showing a case in which the soft start function does not work.
Figure 3:
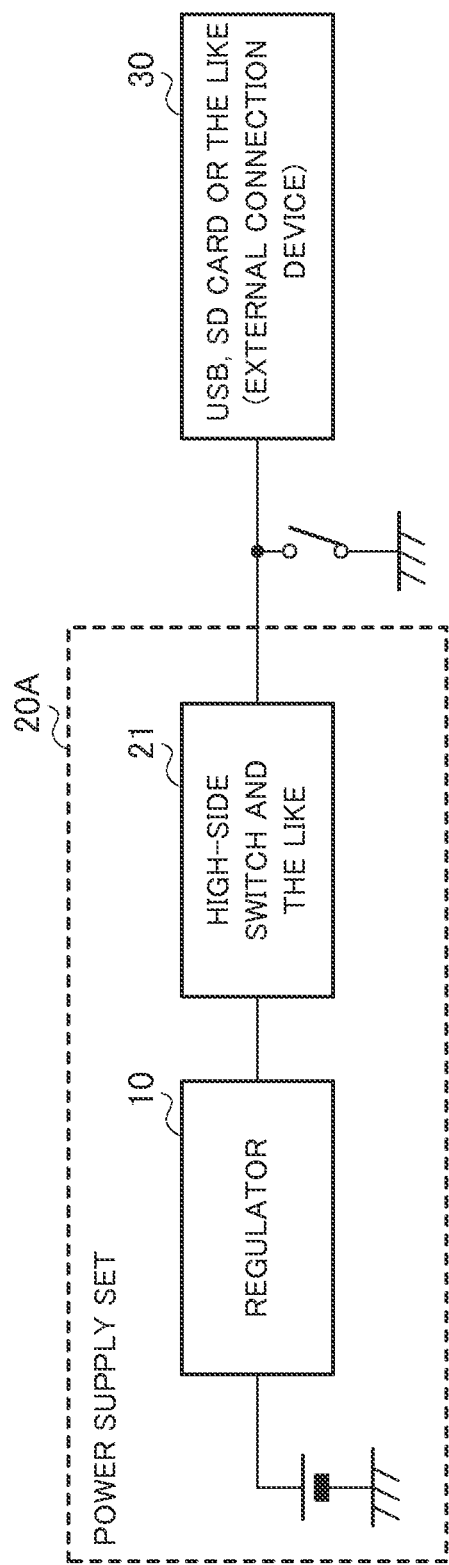
FIG. 3 is a view showing a case in which the soft start function does not work.
Figure 4:
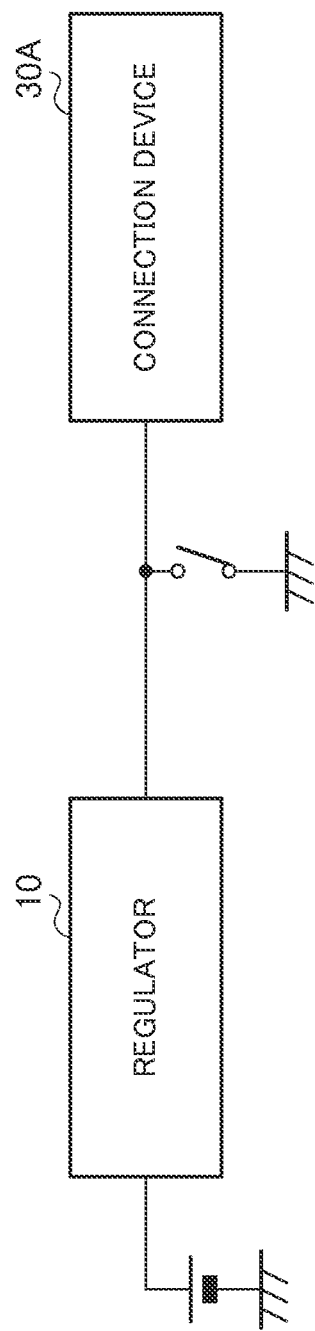
FIG. 4 is a view showing a case in which the soft start function does not work.
Figure 5:
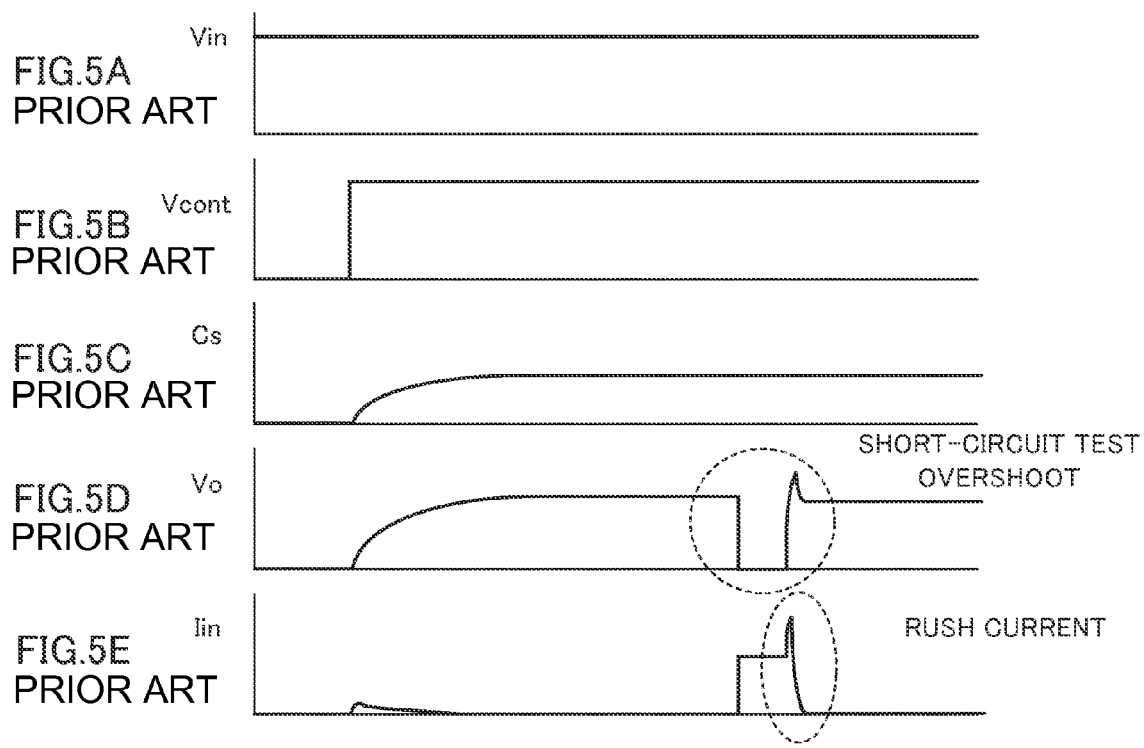
FIGS. 5A-5E are a waveform diagram of each terminal when a short-circuit test of short-circuiting the output voltage Vout is carried out on a conventional regulator.

Here, with the soft start circuit 120 alone, the rush current flows to generate an overshoot in the output voltage when the soft start function does not work due to some abnormality, as described in the aforesaid FIGS. 2 to 4.

In regulator 100, soft start reset circuit 130 for resetting soft start circuit 120 at the time of output short-circuit is disposed in parallel to error amplifier 110. Soft start reset circuit 130 resets soft start circuit 120 at the time of output short-circuit. Soft start reset circuit 130 is made of comparator 131 that is disposed in parallel to the input of error amplifier 110, an offset voltage 132 that gives an offset to the input of comparator 131, and NPN transistor 133 that discharges capacitor C by being turned on at the time of output short-circuit in accordance with a result of comparison of comparator 131.

Comparator 131 turns discharging NPN transistor 133 off at the time of starting-up of the soft start and the time of stationary state by superposing the input offset.

At the starting-up time and at the time of normal operation, error amplifier 110 of regulator 100 has inputs having almost the same electrical potential, so that comparator 131 with an offset remains being turned off and does not affect the normal operation.

As shown within the broken line of FIG. 7D, at the time of output short-circuit, short-circuit is detected below offset voltage 132 of comparator 131, whereby comparator 131 with an offset is turned on.

Referring to FIG. 7C, when comparator 131 is turned on, NPN transistor 133 is turned on to discharge externally attached capacitor C connected to connection terminal Cs.

Referring to FIG. 7D, after the output short-circuit is released, the normal soft start is started. For this reason, the rush current and the overshoot are not generated, so that no inconvenience is generated (see within the broken line of FIG. 7E).

An operation of soft start circuit 120 will be described further in detail.

Figure 8:
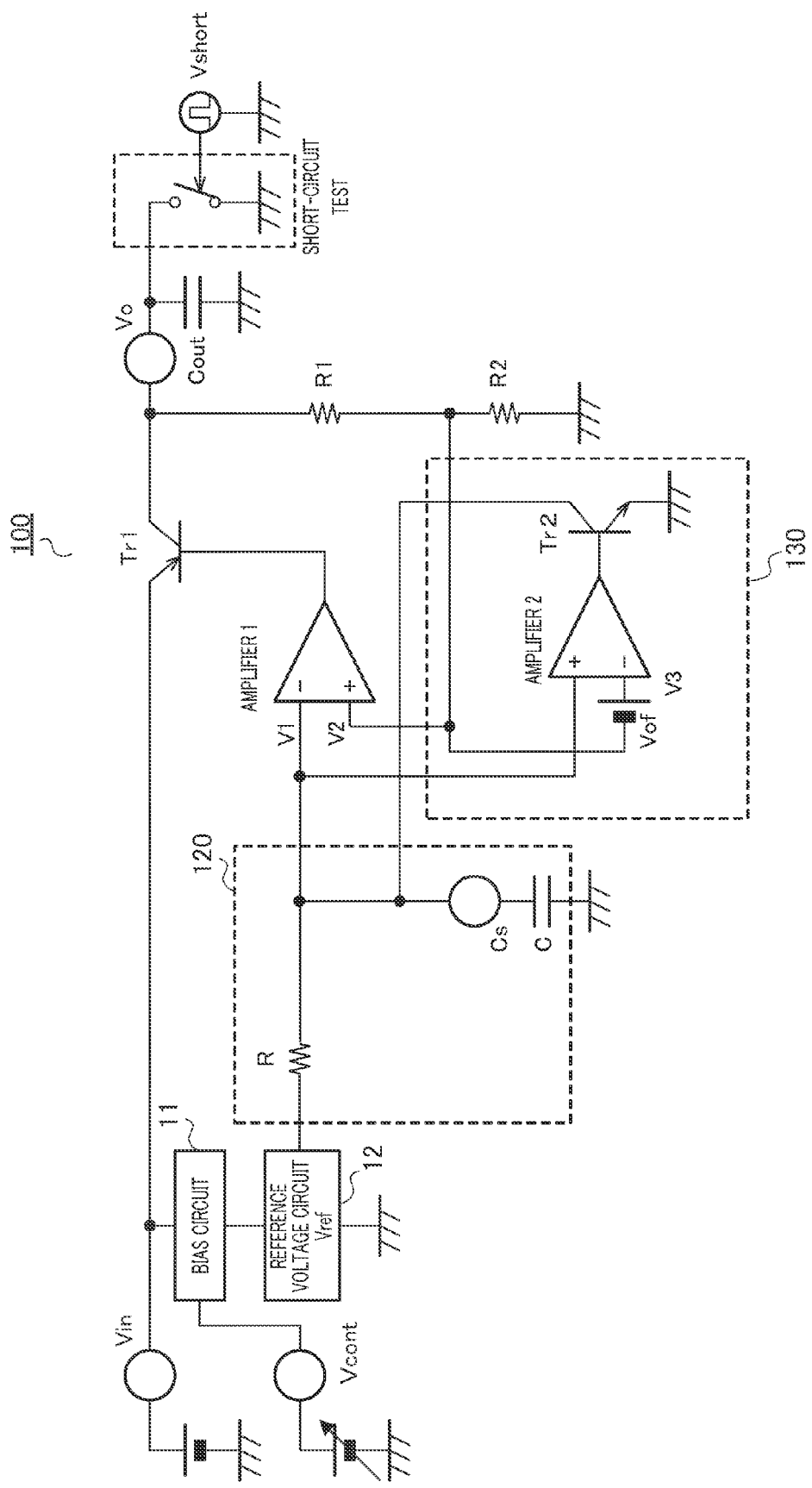
FIG. 8 is a circuit diagram describing a detailed operation of the regulator of Embodiment 1 described above.

FIG. 8 is a circuit diagram describing a detailed operation of regulator 100, and is the same as the circuit of FIG. 6. For the sake of description, output transistor Q1, NPN transistor 133, error amplifier 110, and comparator 131 will be abbreviated as Tr1, Tr2, amplifier 1, and amplifier 2, respectively. Also, it is assumed that the voltage of inverting input terminal (−) of amplifier 1 is V1; the feedback voltage of non-inverting input terminal (+) is V2; offset voltage 132 of amplifier 2 is Vof, and the voltage of inverting input terminal (−) thereof is V3.

Figure 9:
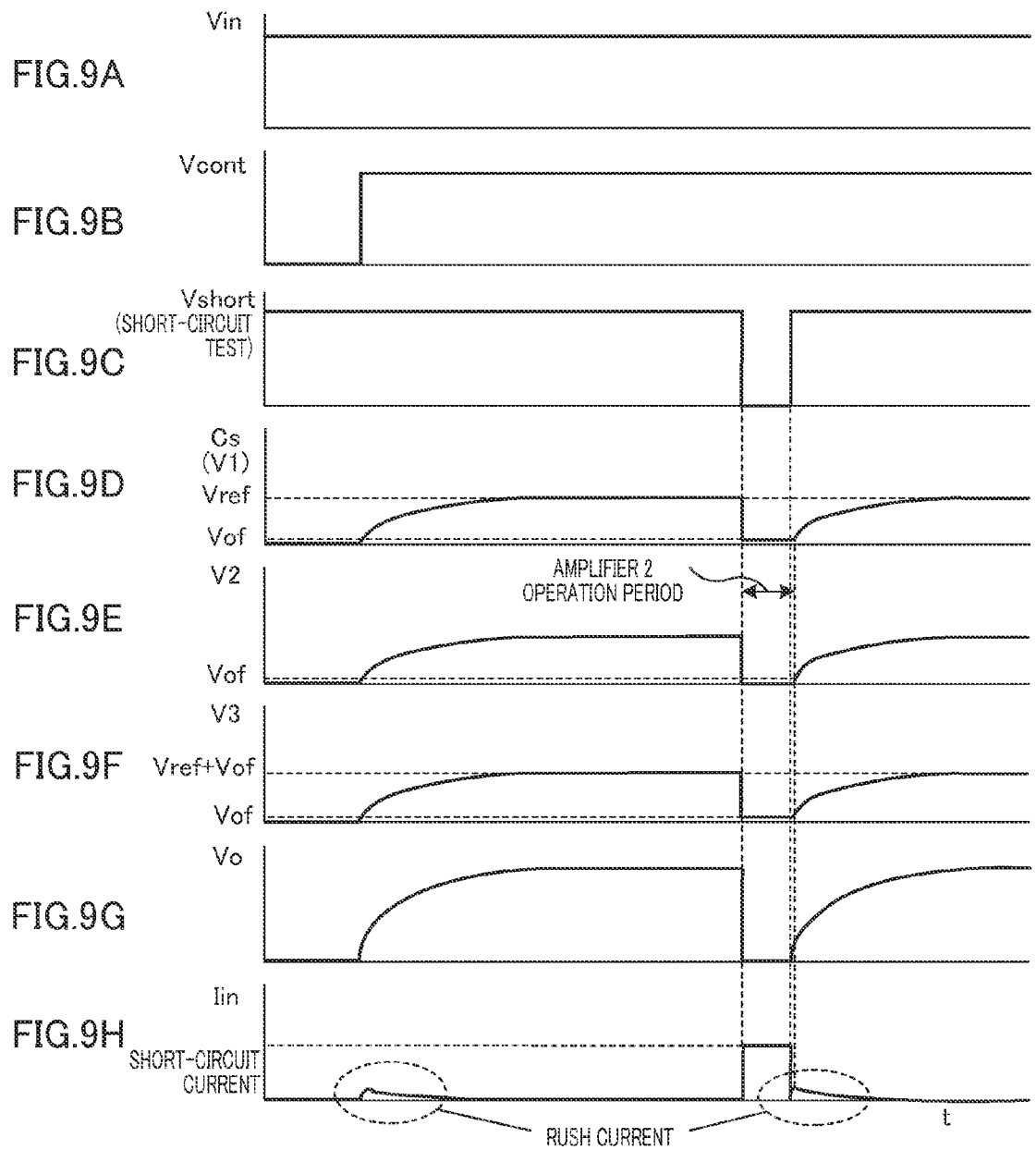
FIGS. 9A-9H are a waveform diagram of each terminal when a short-circuit test of short-circuiting the output voltage is carried out on the regulator of Embodiment 1 described above.

FIG. 9 is a waveform diagram of each terminal when a short-circuit test of short-circuiting output voltage Vout is carried out on regulator 100 of FIG. 8.

(1) Normal operation (see FIGS. 9A, 9B) The input of amplifier 1 is V1=V2 by the negative feedback operation.

The input of amplifier 2 is V3=V2+Vof, so that Tr2 is turned off because V1<V3=V2+Vof. Therefore, the regulator operation is not affected.

(2) Operation at the time of Vo short-circuit (see FIGS. 9C to 9H) When Vo=0 V, V1>V3=V2+Vof=Vof because V2=0 V, so that Tr2 is turned on. Namely, feedback voltage V2 is represented by the following equation 1.

$$V2=R2*Vo/(R1+R2) \qquad \text{(Equation 1)}$$

Tr2 is turned on to set the electrical potential of connection terminal Cs to be generally the GND level. This discharges the electric charge of externally attached capacitor C connected to connection terminal Cs (see FIG. 9D). Also, in amplifier 2, a negative feedback is applied, and a stable state is brought at an electrical potential of V1=V3=Vof (see FIG. 9E). In amplifier 1, Tr1 is in an on-state because V1=Vof>V2=0 V.

(3) Operation at the time of restoration from Vo short-circuit.

When the Vo short-circuit is released (see FIG. 9C), Vo is started up because Tr1 is on even when Vo=0 V (see FIG. 9G).

When Vo is started up to V2=V1=Vof electrical potential, a negative feedback is applied again in amplifier 1 (see FIG. 9F).

Because amplifier 2 is turned off, externally attached capacitor C connected to connection terminal Cs is started to be charged up again, and the soft start is operated (see FIG. 9D). At the time of soft start, amplifier 2 is turned off because starting up is carried out with V1=V2.

Also, even in the case of half short-circuit, a negative feedback is applied to connection terminal Cs with an electrical potential of V1=V3=V2+Vof. For this reason, the soft start is operated from the half short-circuit electrical potential.

In this manner, in both of the cases of short-circuit and half short-circuit, a negative feedback is applied with an electrical potential of V1=V3=V2+Vof, whereby soft start circuit 120 is temporarily reset by soft start reset circuit 130, and the soft start is started again. As shown in FIG. 9H, generation of the rush current can be alleviated.

Hereinafter, Examples of regulator 100 according to the present embodiment will be described.

Each Example is a specific example of an offset of the comparator equipped with the offset.

EXAMPLE 1

Figure 10:
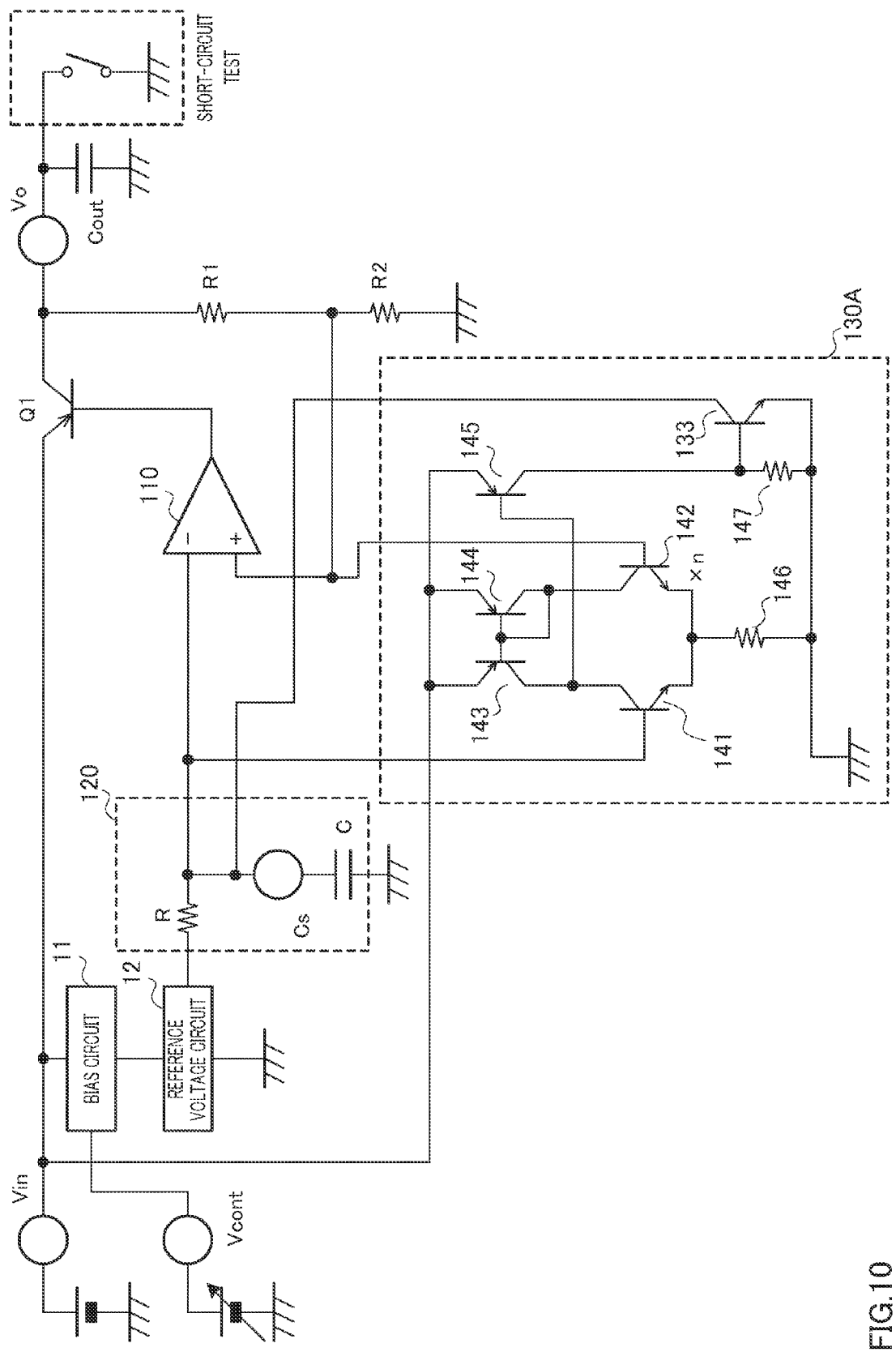
FIG. 10 is a circuit diagram illustrating a detailed structure of a soft start reset circuit of the regulator of Embodiment 1 described above.

FIG. 10 is a circuit diagram showing a detailed structure of soft start reset circuit 130A of regulator 100. FIG. 10 is an example in which the comparator of soft start reset circuit 130 of FIG. 6 is formed with an NPN transistor, and the offset thereof is formed with n-multiple of the emitter size.

Referring to FIG. 10, soft start reset circuit 130A includes NPN transistors 141 and 142 constituting a differential stage of the comparator, PNP transistors 143 and 144 in current mirror connection that operate NPN transistors 141 and 142, PNP transistor 145 constituting an output stage of the comparator, and resistors 146 and 147.

An offset is set in one of the inputs of the comparator by changing the emitter size between NPN transistor 141 and NPN transistor 142. Here, the emitter size of NPN transistor 142 is structured to be an n-multiple (×n) of the emitter size of NPN transistor 141. Namely, the offset of the comparator with an offset is set by an n-multiple (×n) of the emitter size of NPN transistor 141. A specific example of the offset voltage will be described later.

The present example in which the offset voltage is set by the n-multiple (×n) of the emitter size of a transistor has an advantage of facilitating enhancing the fabrication precision as compared with an example in which a resistor is connected to the emitter.

EXAMPLE 2

Figure 11:
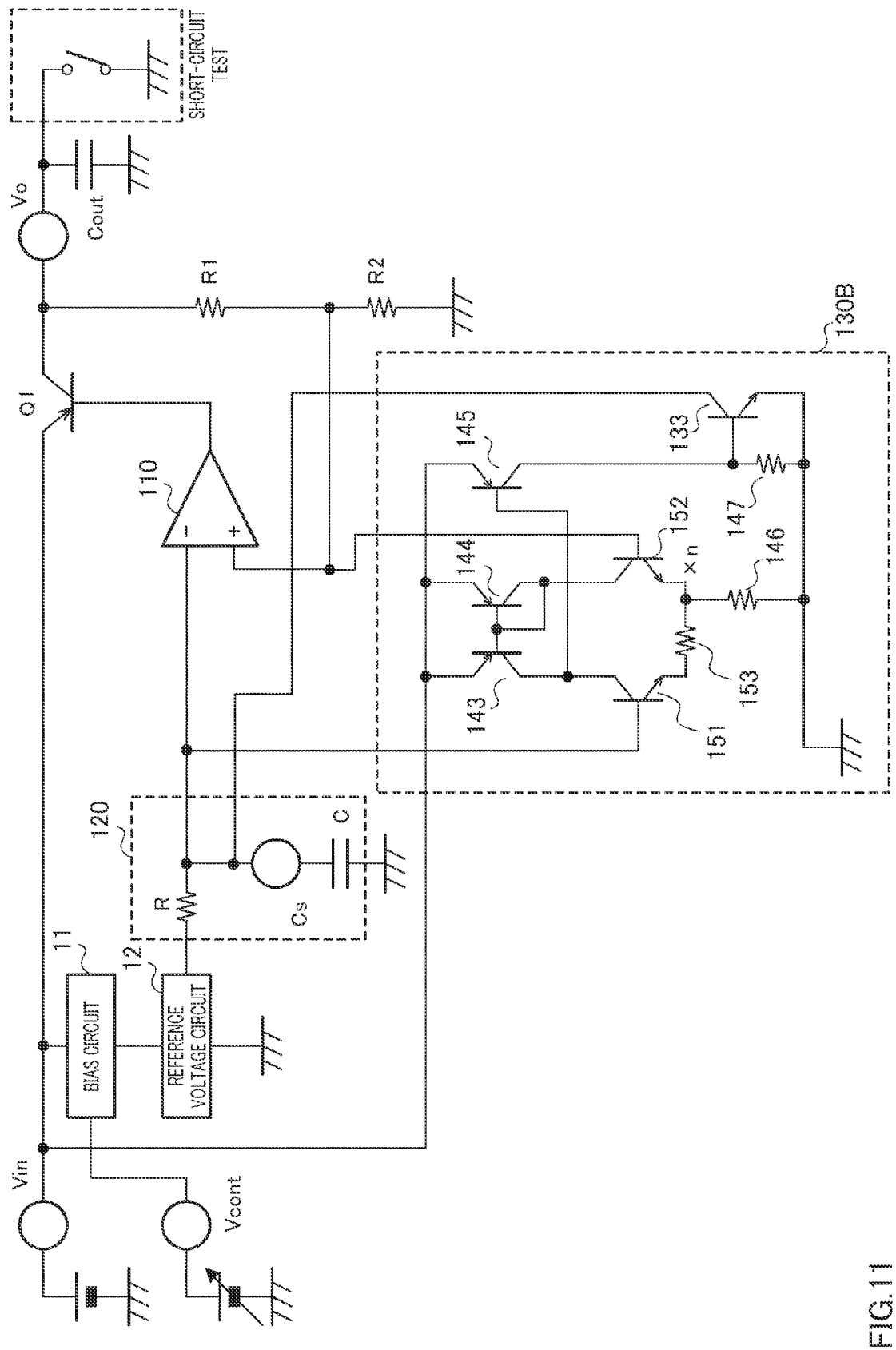
FIG. 11 is a circuit diagram illustrating a detailed structure of a soft start reset circuit of the regulator of Embodiment 1 described above.

FIG. 11 is a circuit diagram showing a detailed structure of soft start reset circuit 130B of regulator 100. Constituent elements similar to those appearing in FIG. 10 will be denoted with similar reference signs. FIG. 11 is an example in which the comparator of soft start reset circuit 130 of FIG. 6 is formed with an NPN transistor, and the offset thereof is structured by connection of a resistor.

Referring to FIG. 11, soft start reset circuit 130B includes NPN transistors 151 and 152 constituting a differential stage of the comparator, PNP transistors 143 and 144 in current mirror connection that operate NPN transistors 151 and 152, PNP transistor 145 constituting an output stage of the comparator, and resistors 153, 146 and 147.

NPN transistor 151 and NPN transistor 152 have the same emitter size. Resistor 153 is connected to the emitter of NPN transistor 151. An offset is set in one of the inputs of the comparator by connecting resistor 153 to the emitter of NPN transistor 151.

The offset of the comparator with an offset is set by an n-multiple (×n) of the emitter size of NPN transistor 141. A specific example of the offset voltage will be described later.

Even with the present example in which the offset voltage is set by connecting a resistor to the emitter of the transistor, there is no problem in the precision when the offset voltage is several ten to 100 mV.

EXAMPLE 3

Figure 12:
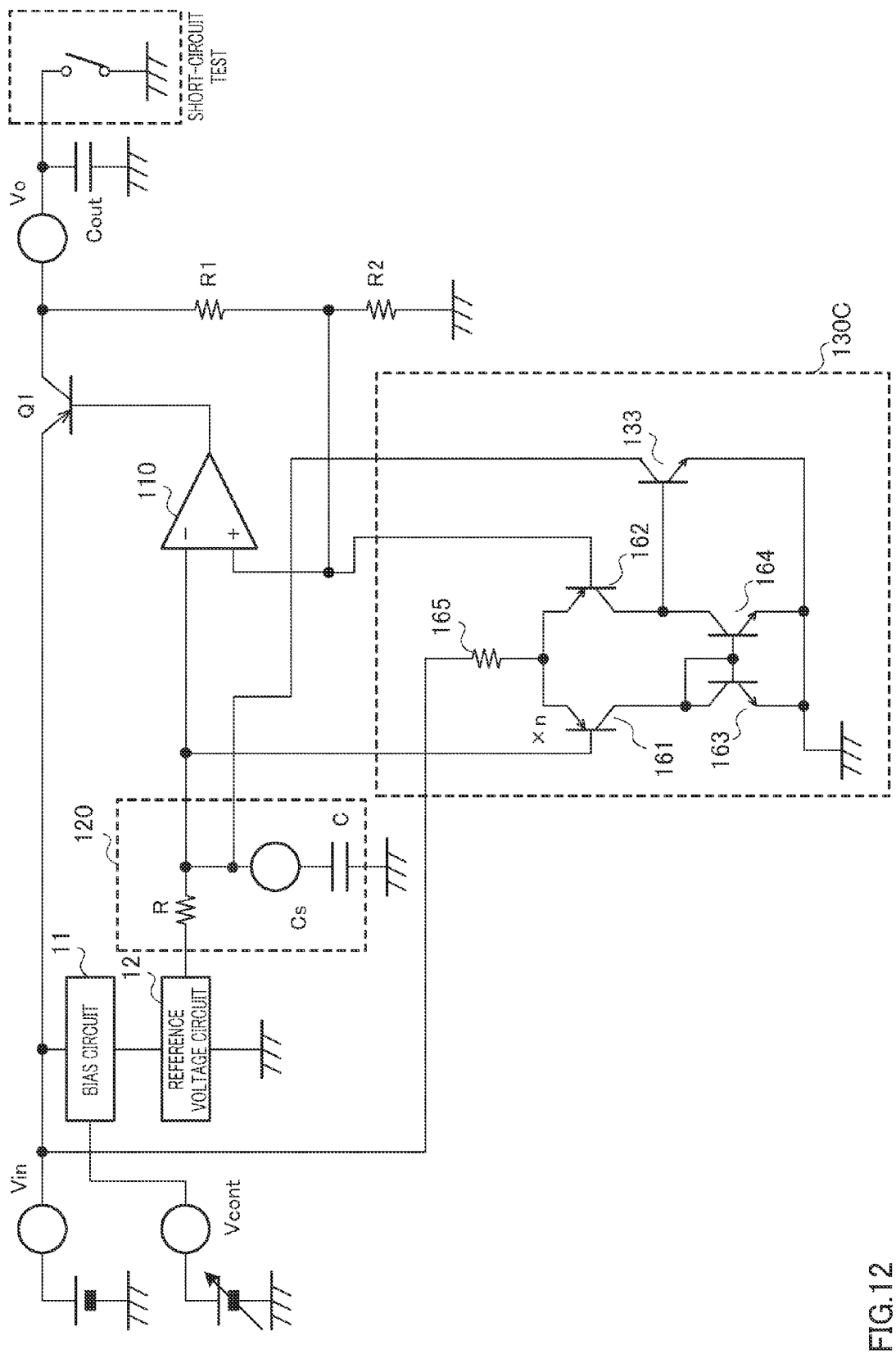
FIG. 12 is a circuit diagram illustrating a detailed structure of a soft start reset circuit of the regulator of Embodiment 1 described above.

FIG. 12 is a circuit diagram showing a detailed structure of soft start reset circuit 130C of regulator 100. Constituent elements similar to those appearing in FIG. 10 will be denoted with similar reference signs. FIG. 12 is an example in which the comparator of soft start reset circuit 130 of FIG. 6 is formed with a PNP transistor, and the offset thereof is formed with n-multiple of the emitter size.

Referring to FIG. 12, soft start reset circuit 130C includes PNP transistors 161, 162 constituting a differential stage of the comparator, NPN transistors 163, 164 in current mirror connection that operate PNP transistors 161, 162, and resistor 165.

An offset is set in one of the inputs of the comparator by changing the emitter size between PNP transistor 161 and PNP transistor 162. Here, the emitter size of PNP transistor 161 is structured to be an n-multiple (×n) of the emitter size of PNP transistor 162.

EXAMPLE 4

Figure 13:
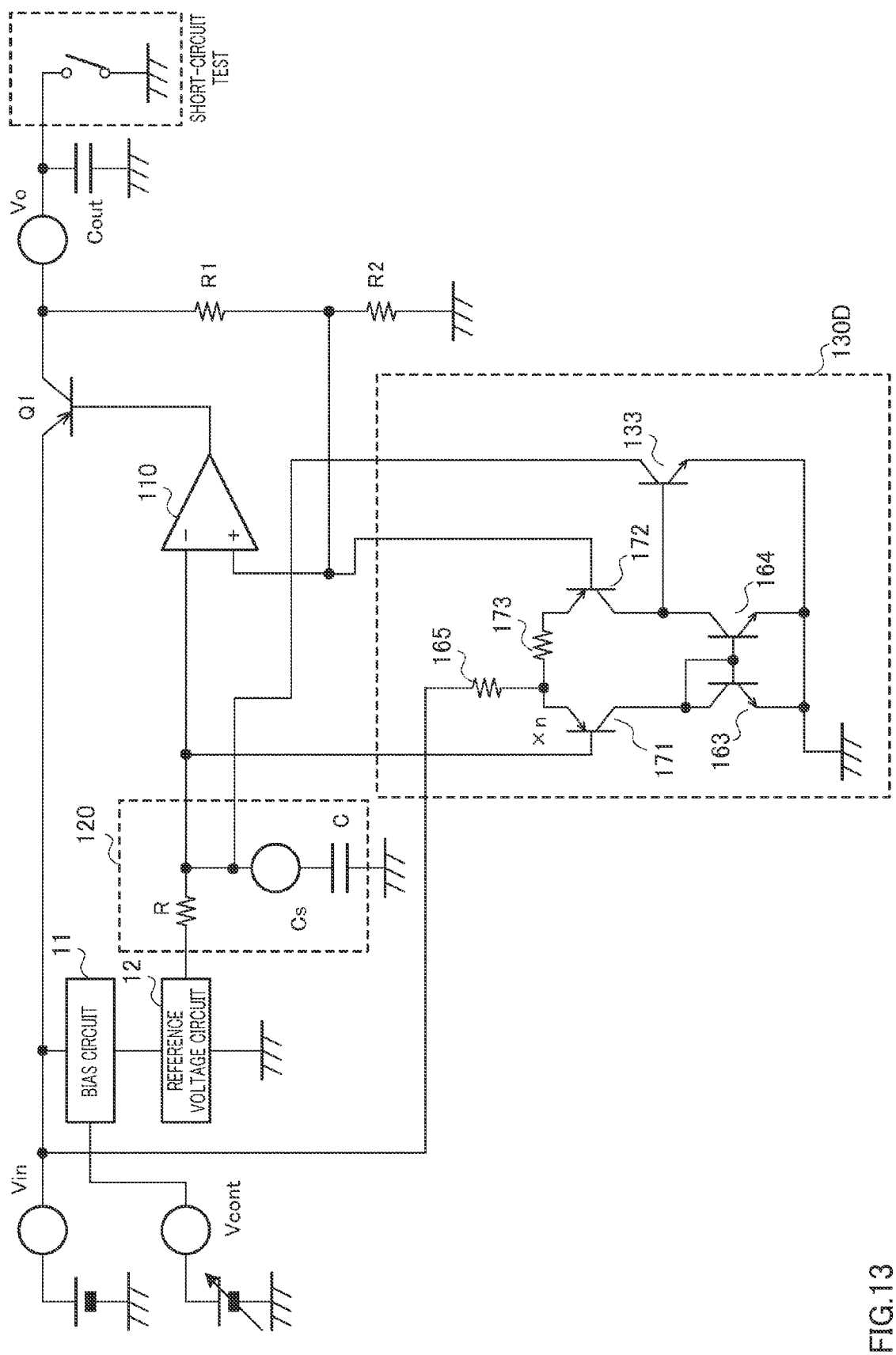
FIG. 13 is a circuit diagram illustrating a detailed structure of a soft start reset circuit of the regulator of Embodiment 1 described above.

FIG. 13 is a circuit diagram showing a detailed structure of soft start reset circuit 130D of regulator 100. Constituent elements similar to those appearing in FIG. 12 will be denoted with similar reference signs. FIG. 13 is an example in which the comparator of soft start reset circuit 130 of FIG. 6 is formed with a PNP transistor, and the offset thereof is structured by connection of a resistor.

Referring to FIG. 13, soft start reset circuit 130D includes PNP transistors 171, 172 constituting a differential stage of the comparator, NPN transistors 163, 164 in current mirror connection that operate PNP transistors 171, 172, and resistors 173, 165.

PNP transistor 171 and PNP transistor 172 have the same emitter size. Resistor 173 is connected to the emitter of PNP transistor 172. An offset is set in one of the inputs of the comparator by connecting resistor 173 to the emitter of PNP transistor 172.

EXAMPLE 5

Figure 14:
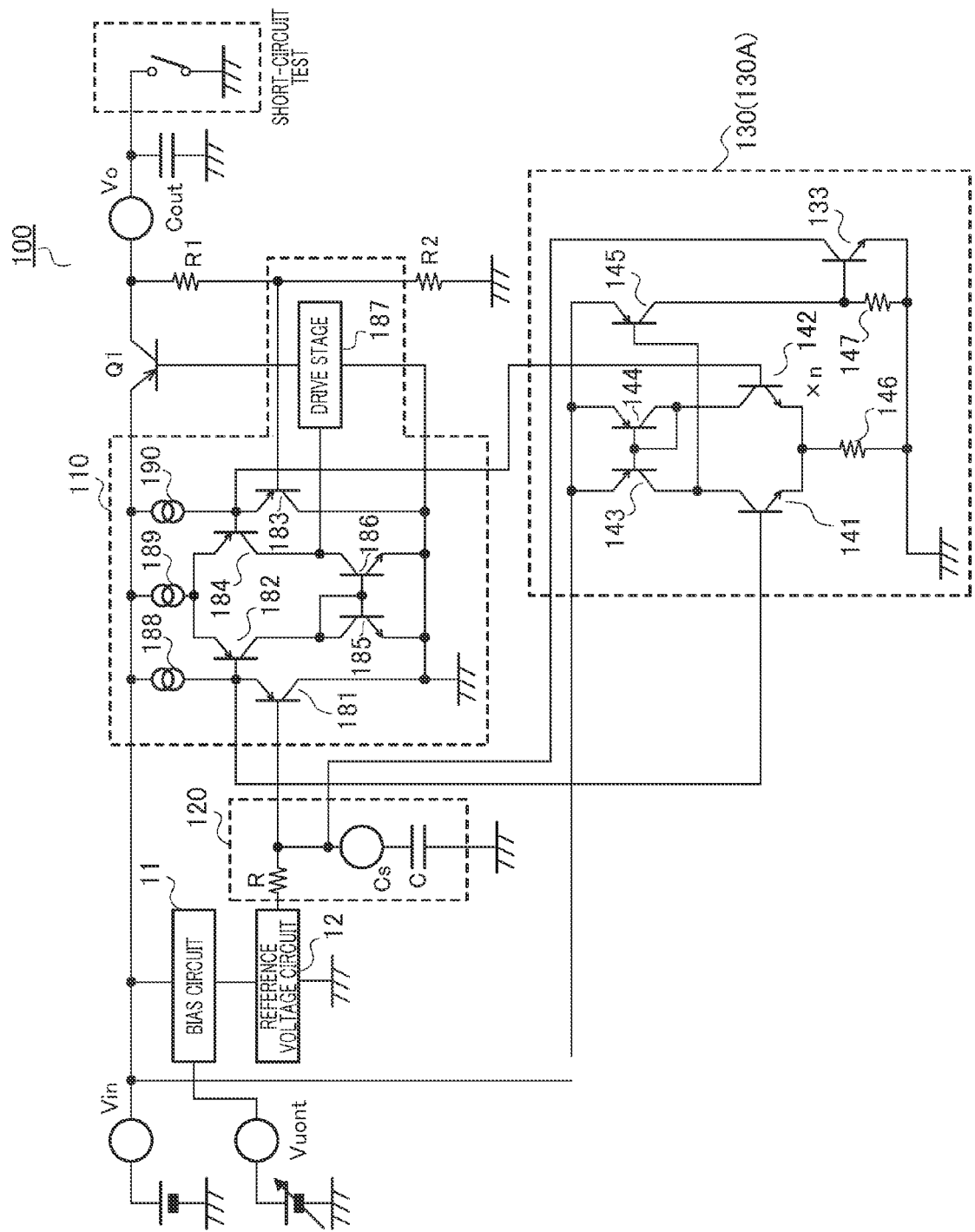
FIG. 14 is a circuit diagram illustrating a detailed structure of an error amplifier and a soft start reset circuit of the regulator of Embodiment 1 described above.

FIG. 14 is a circuit diagram showing a detailed structure of error amplifier 110 and soft start reset circuit 130 of regulator 100. The present circuit is a detailed circuit structure that is actually mounted on the regulator and in which the operation thereof has been confirmed, where the operation confirmation and verification have been completed.

The comparator of soft start reset circuit 130 is an example to which soft start reset circuit 130A of FIG. 10 is applied. Soft start reset circuits 130B to 130D of FIGS. 11 to 13 may be used instead of soft start reset circuit 130A of FIG. 10.

Referring to FIG. 14, error amplifier 110 includes PNP transistors 181, 182 and PNP transistors 183, 184 connected by Darlington connection and constituting a differential stage of the comparator, NPN transistors 185, 186 in current mirror connection that operate PNP transistors 182, 184, drive stage 187 constituting an output stage of the comparator, and current sources 188 to 190.

The input of error amplifier 110 is set to be a Darlington input (namely, bases of PNP transistors 181 and 183) for performing soft start operation from 0 V.

Also, for input of soft start reset circuit 130A, the voltage is taken from the second stage of the Darlington input (namely, bases of NPN transistors 141 and 142) in view of ensuring the operation voltage.

[Offset Voltage of Soft Start Reset Circuit 130]

The offset voltage of soft start reset circuit 130 is as follows.

For example, in soft start reset circuits 130A, 130C of FIGS. 10, 12 and 14, n=2 is used for the n-multiple (×n) of the emitter size. Offset voltage Vof is represented by the following equation 2.

$$Vof = VT * ln2 = 18\ mV \qquad \text{(Equation 2)}$$

Here, it was set that VT: thermal voltage 26 mV.

The offset voltage is set for the purpose of preventing erroneous operation caused by load fluctuation or transient response to the load. For this reason, several tens of mV is a suitable value for the input offset voltage of error amplifier 110.

As described above in detail, according to the present embodiment, regulator 100 includes error amplifier 110 that compares a reference voltage with a feedback voltage obtained by voltage division of a voltage of output terminal Vo and outputs a voltage that accords to an error, soft start circuit 120 that gradually starts up the reference voltage that is input into error amplifier 110 from 0 V to the reference voltage, and soft start reset circuit 130 that monitors an input of error amplifier 110 and performs soft start of soft start circuit 120 again when an output of output terminal Vo is short-circuited. Soft start reset circuit 130 includes comparator 131 disposed in parallel to the input of error amplifier 110, offset voltage 132 that gives an offset to the input of comparator 131, and NPN transistor 133 that is turned on or off in accordance with a comparison result of comparator 131 and discharges capacitor C by being turned on at the time of output short-circuit.

Comparator 131 turns discharging NPN transistor 133 off at the time of starting-up of the soft start and at the time of stationary state by superposing the input offset. Also, at the starting-up time and at the time of normal operation, the error amplifier has an almost equal electrical potential, so that comparator 131 with an offset remains being turned off and does not affect the normal operation.

At the time of output short-circuit, short-circuit is detected below offset voltage 132 of comparator 131, whereby comparator 131 with an offset is turned on. When comparator 131 is turned on, NPN transistor 133 is turned on to discharge capacitor C of soft start circuit 120. After the output short-circuit is released, the normal soft start is carried out, so that the rush current and the overshoot are not generated, whereby no inconvenience is generated.

In this manner, soft start reset circuit 130 resets soft start circuit 120 and starts the soft start after the short-circuit occurs. In other words, soft start reset circuit 130 is a circuit that is started up only when the output short-circuit occurs and does not operate at the time of starting-up or at the time of normal operation by comparator 131 with an offset.

The following advantageous effects can be gained.

(1) Even after restoring from output short-circuit, the soft start is operated, so that the rush current is not generated, and poor starting due to insufficient current capability of the previous stage structure does not occur.

(2) Erroneous operation exceeding the reset voltage is not generated by electrical potential decrease caused by the rush current.

(3) Even if the output short-circuit occurs by abnormality, the soft start is started, so that the overshoot at the time of restoring is not generated, and an excessive voltage is not applied to a device of the subsequent stage and does not destroy the device.

(4) The input of comparator 131 monitors the input of error amplifier 110 and performs analog control. Soft start reset circuit 130 discharges until the inputs of comparator 131 have the same electrical potential, so that an analog-type feedback is applied, and the soft start is started from almost the same electrical potential (offset voltage 132 is present). Therefore, the soft start is started even in the case of rare short-circuit, and the rush current is always prevented from being generated.

(Embodiment 2)

Figure 15:
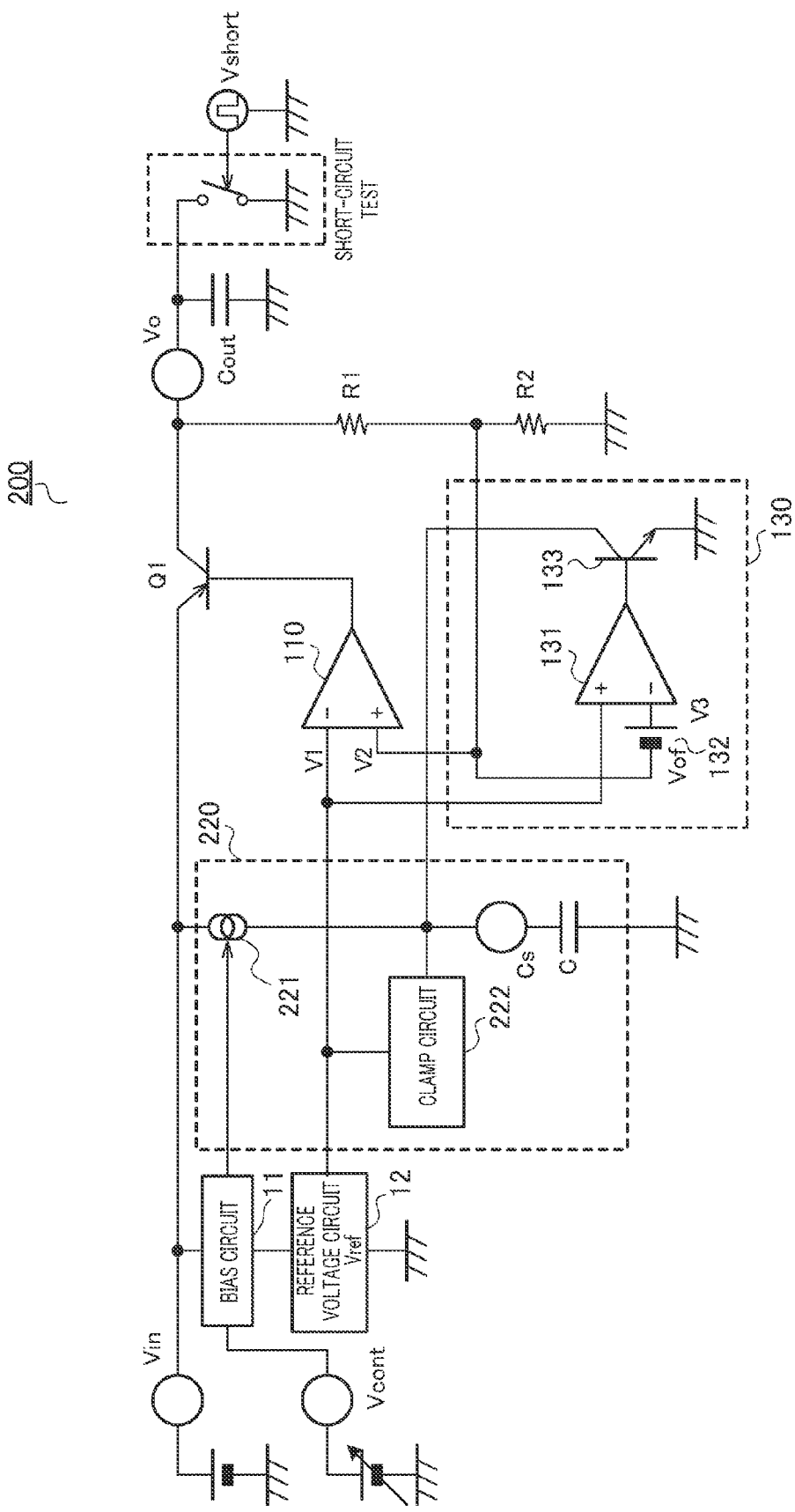
FIG. 15 is a circuit diagram illustrating a structure of a regulator having a soft start function according to Embodiment 2 of the present invention.

FIG. 15 is a circuit diagram illustrating a structure of a regulator having a soft start function according to Embodiment 2 of the present invention. The present embodiment is an example of making a soft start by a current source. In describing the present embodiment, constituent elements similar to those appearing in FIG. 6 are denoted with similar reference signs, and description of duplicated parts will be omitted.

Referring to FIG. 15, regulator 200 includes power supply voltage input terminal Vin, control voltage input terminal Vcont, resistor R, connection terminal Cs for connecting externally attached capacitor C, output transistor Q1, bias circuit 11, reference voltage circuit 12, error amplifier 110, soft start circuit 220, soft start reset circuit 130, voltage-division resistors R1 and R2, output voltage Vout output terminal Vo, and output capacitor Cout.

Soft start circuit 220 gradually raises the reference voltage output that is supplied to error amplifier 110, and alleviates the overshoot of output voltage Vout by preventing the rush current that charges up output capacitor Cout at the time of energizing the power supply.

Soft start circuit 220 includes current source 221 that allows a predetermined current to flow through externally attached capacitor C connected to connection terminal Cs by a bias voltage of bias circuit 11 and a clamp circuit 222.

Hereinafter, operation of regulator 200 structured as shown above will be described. The basic operation is similar to that of Embodiment 1.

When electric charge is not stored in externally attached capacitor C, current source 221 stores electric charge in capacitor C at a predetermined speed.

When the electrical potential of externally attached capacitor C connected to connection terminal Cs is smaller than the reference voltage, soft start circuit 220 linearly raises the output by charging voltage of externally attached capacitor C and clamp circuit 222, thereby implementing a soft start.

When the electrical potential of externally attached capacitor C connected to connection terminal Cs is equal to or larger than the reference voltage, soft start circuit 220 turns clamp circuit 222 off, whereby the reference voltage is supplied from reference voltage circuit 12 to error amplifier 110, and a predefined output voltage is output.

In this manner, soft start circuit 220 of regulator 200 includes current source 221 and clamp circuit 222 instead of the CR circuit. Soft start circuit 220 is gradually and linearly started up by current source 221 and clamp circuit 222. For this reason, it can be expected that generation of the rush current is further more reduced. However, the CR circuit may be used in view of the purpose of suppressing the rush current.

(Embodiment 3)

Figure 16:
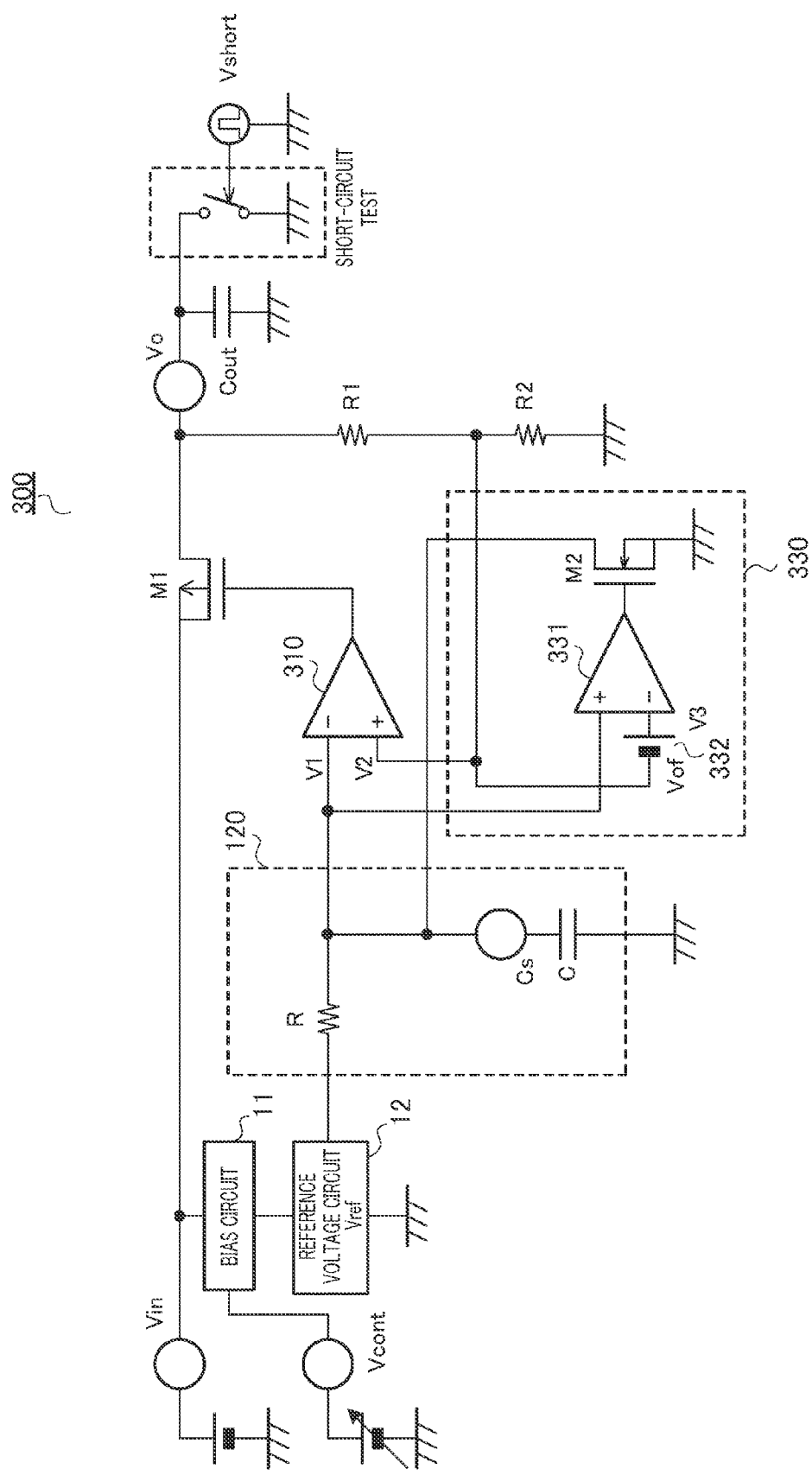
FIG. 16 is a circuit diagram illustrating a structure of a regulator formed by a CMOS process according to Embodiment 3 of the present invention.

FIG. 16 is a circuit diagram illustrating a structure of a regulator formed by a CMOS process according to Embodiment 3 of the present invention. In describing the present embodiment, constituent elements similar to those appearing in FIG. 6 will be denoted with similar reference signs, and description of duplicated parts will be omitted.

Referring to FIG. 16, regulator 300 includes power supply voltage input terminal Vin, control voltage input terminal Vcont, resistor R, connection terminal Cs for connecting externally attached capacitor C, P-channel MOS transistor M1, bias circuit 11, reference voltage circuit 12, error amplifier 310 formed by a CMOS process, soft start circuit 120, soft start reset circuit 330, voltage-division resistors R1 and R2, output voltage Vout output terminal Vo, and output capacitor Cout.

Error amplifier 310 is made of an operation amplifier formed by a CMOS process, where the feedback voltage obtained by voltage division of output voltage Vout with resistors R1 and R2 is input to non-inverting input terminal (+), and the reference voltage is input to inverting input terminal (−) via soft start circuit 120. Error amplifier 310 performs voltage feedback by supplying an output voltage that accords to the difference between the feedback voltage and the reference voltage to the gate of P-channel MOS transistor M1 which is an output transistor, whereby output voltage Vout of regulator 300 is maintained to be a constant voltage.

Soft start circuit 120 gradually raises the reference voltage output that is supplied to error amplifier 310, and prevents the rush current that charges up output capacitor Cout at the time of energizing the power supply. For example, soft start circuit 120 is a CR circuit that is inserted between error amplifier 310 and reference voltage and made of resistor R and externally attached capacitor C, and realizes a soft start by allowing the start-up of the reference voltage at the time of energizing the power supply to have a CR time constant.

Soft start reset circuit 330 is connected in parallel to the input of error amplifier 310 and resets soft start circuit 120 at the time of output short-circuit. Soft start reset circuit 330 includes comparator 331 formed by a CMOS process, offset voltage 332 that gives an offset to the input of comparator 331, and N-channel MOS transistor M2 that is turned on or off in accordance with a comparison result of comparator 331 and discharges capacitor C by being turned on at the time of output short-circuit.

Operation of regulator 300 is similar to that of Embodiment 1.

In regulator 300 formed by a CMOS process, advantageous effects similar to those of Embodiment 1 can be produced, that is, a regulator by which a soft start is started even when output short-circuit occurs by abnormality can be realized.

Figure 17:
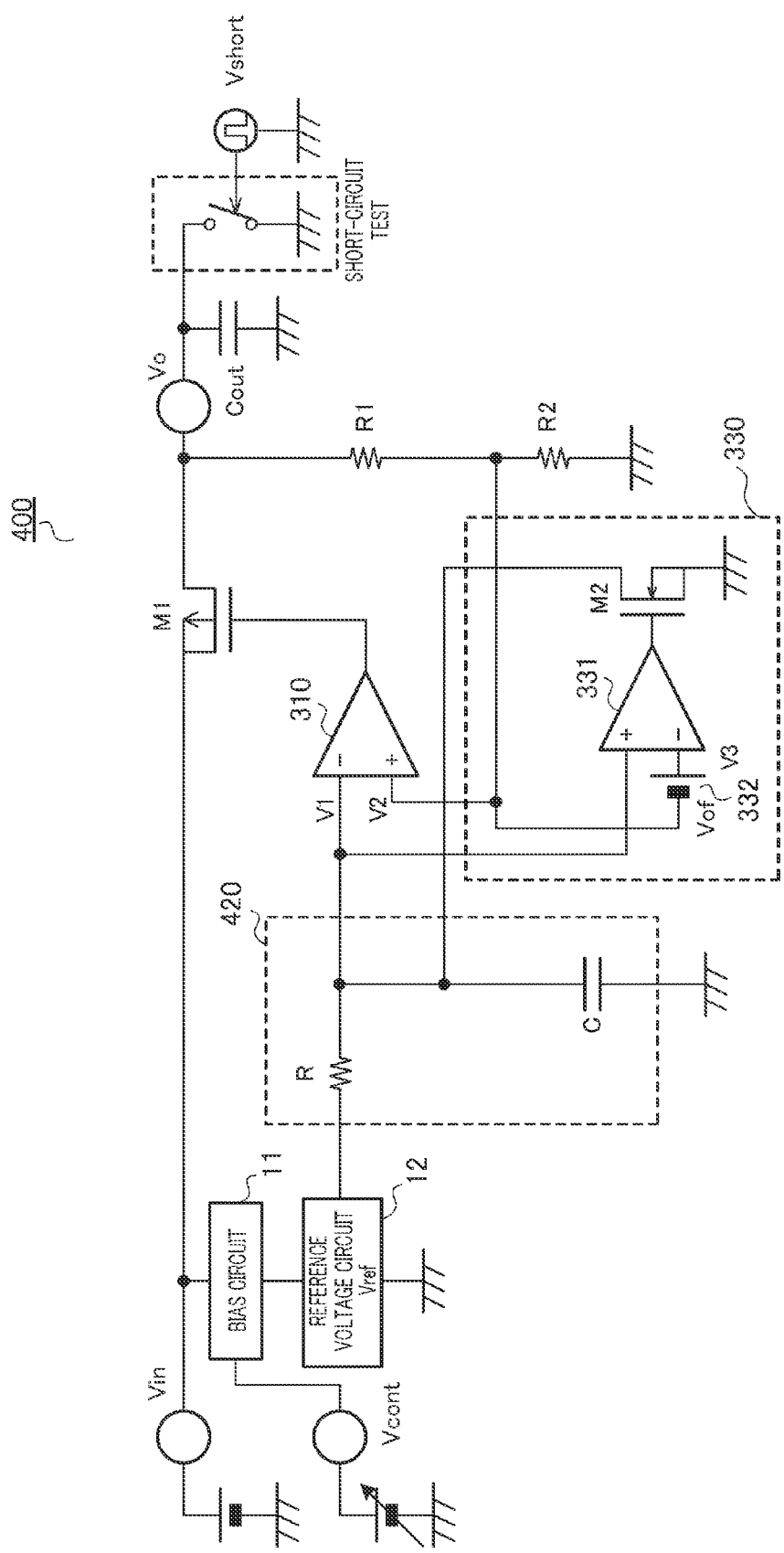
FIG. 17 is a circuit diagram illustrating a structure of a regulator formed by a CMOS process according to Embodiment 3 described above.

FIG. 17 is a circuit diagram illustrating a structure of a regulator formed by a CMOS process according to Embodiment 3 of the present invention. Constituent parts similar to those appearing in FIG. 16 are denoted with similar reference signs.

Referring to FIG. 17, regulator 400 includes power supply voltage input terminal Vin, control voltage input terminal Vcont, resistor R, capacitor C, P-channel MOS transistor M1, bias circuit 11, reference voltage circuit 12, error amplifier 310 formed by a CMOS process, soft start circuit 420, soft start reset circuit 330, voltage-division resistors R1 and R2, output voltage Vout output terminal Vo, and output capacitor Cout.

Soft start circuit 420 is a CR circuit inserted between error amplifier 310 and the reference voltage and made of resistor R and capacitor C.

In FIG. 17, capacitor C of the CR circuit constituting soft start circuit 420 is incorporated in regulator 400.

Here, in regulators 300, 400 formed by a CMOS process, a soft start circuit using current source 221 and clamp circuit 222 of Embodiment 2 may be applied instead of the CR circuit.

(Embodiment 4)

Figure 18:
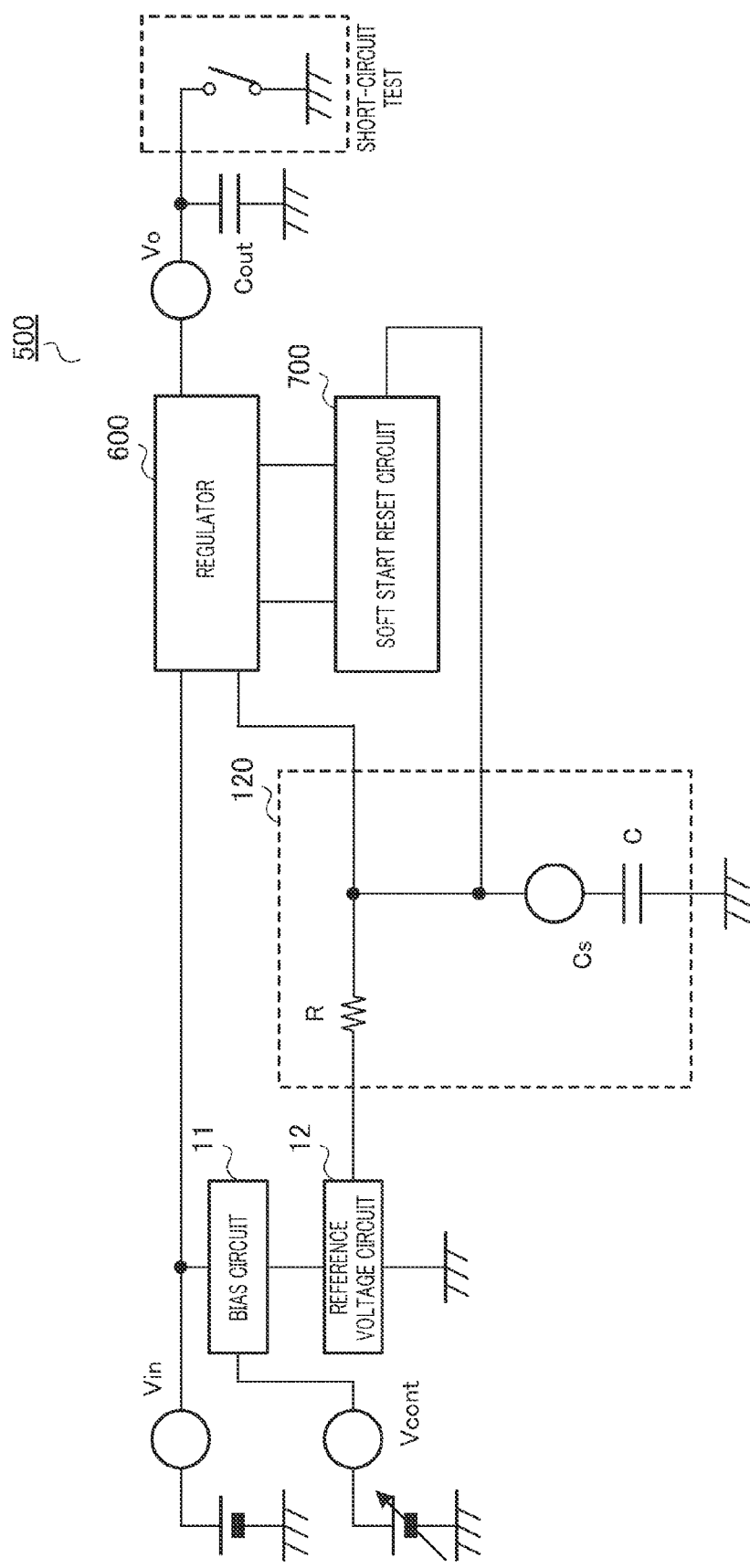
FIG. 18 is a block diagram illustrating a structure of a DC/DC converter having a soft start function according to Embodiment 4 of the present invention.

FIG. 18 is a block diagram illustrating a structure of a DC/DC converter having a soft start function according to Embodiment 4 of the present invention. The present embodiment is an example of making a soft start by a CR circuit. In describing the present embodiment, constituent elements similar to those appearing in FIG. 6 are denoted with similar reference signs.

Referring to FIG. 18. DC/DC converter 500 includes power supply voltage input terminal Vin, control voltage input terminal Vcont, resistor R, connection terminal Cs for connecting an externally attached capacitor C, bias circuit 11, reference voltage circuit 12, regulator 600, soft start circuit 120, soft start reset circuit 700, output voltage Vout output terminal Vo, and output capacitor Cout.

Regulator 600 is a series regulator of any of regulators 100, 200, 300 and 400.

Soft start reset circuit 700 is a soft start reset circuit of any of soft start reset circuits 130, 130A-D, and 330.

In this manner, DC/DC converter 500 includes a series regulator of any of regulators 100, 200, 300 and 400, so that advantageous effects similar to those of Embodiments 1 to 3 can be gained, that is, a DC/DC converter in which the soft start is started even in the case in which an output short-circuit occurs by abnormality can be realized.

The above description is an exemplification of the suitable embodiments of the present invention, so that the scope of the present invention is not limited to this.

For example, the present invention may be applied to a switching regulator, whereby similar advantageous effects can be gained.

Also, in each of the above-described embodiments, examples using a bipolar transistor or a MOS transistor have been described; however, any type of transistor may be used. For example, the transistor may be a MIS (Metal Insulated Semiconductor) transistor. Also, this MIS transistor may be a MIS transistor formed on a silicon substrate having an SOI (Silicon On Insulator) structure. Further, the transistor may be a Bi-CMOS or a combination of these. However, it goes without saying that a MOS transistor is advantageous in view of electric power consumption.

Also, in each of the above-described embodiments, the nominations of a regulator and a DC/DC converter have been used; however, this is for the sake of convenience in description, so that they may, of course, be a soft start circuit, a series regulator, a constant-voltage power supply apparatus, a power supply circuit, or the like.

Further, the number of transistors and the type of elements of each circuit section constituting the above-described regulator, for example, a soft start reset circuit, are not limited to those described in the above embodiments. Naturally, it goes without saying that transistors for compensation of various types may be added to the present soft start reset circuit.

The regulator and the DC/DC converter according to the present invention can be generally applied to power supply devices of electronic apparatus as a soft start circuit.

What is claimed is:

1. A regulator comprising:
an error amplifier that compares a reference voltage with a feedback voltage obtained by voltage division of a voltage of an output terminal and outputs a voltage that accords to an error;
a soft start circuit that gradually starts up the reference voltage that is input into said error amplifier; and
a soft start reset circuit that monitors an input of said error amplifier and performs soft start of said soft start circuit again when an output of said output terminal is short-circuited, wherein
said soft start circuit has a capacitor that stores electric charge; and
said soft start reset circuit comprises:
a comparator comprising a differential stage configured to receive the reference voltage that is input from said soft start circuit into said error amplifier and a voltage obtained by superposing an input offset on the feedback voltage input from said output terminal into said error amplifier, and that compares the voltages received by the differential stage; and
a transistor that is turned on or off in accordance with a result of comparison of said comparator and discharges said capacitor by being turned on when the output is short-circuited.

2. The regulator according to claim 1, wherein said comparator is turned off because the input thereof is within a range of said input offset at a time of starting the soft start and at a time of stationary state, thereby turning off said transistor.

3. The regulator according to claim 1, wherein said comparator is turned on because the input thereof exceeds said input offset when the output is short-circuited, thereby turning on said transistor.

4. The regulator according to claim 1, wherein said input offset is set by changing an emitter size of one of transistors on the differential stage to an n-multiple thereof.

5. The regulator according to claim 1, wherein said input offset is set by connecting a resistor to an emitter of one of transistors on the differential stage.

6. The regulator according to claim 1, wherein said soft start circuit raises the reference voltage that is input into said error amplifier, gradually from 0V to said reference voltage.

7. The regulator according to claim 1, wherein said soft start circuit is a capacitor resistor circuit made of said capacitor and a resistor, or a circuit made of said capacitor and a current source.

8. The regulator according to claim 1, comprising an output transistor that is connected between a power supply voltage input terminal and said output terminal and outputs a constant output voltage by being turned on or off by receiving an output of said error amplifier at a gate thereof.

9. A direct current to direct current converter having a regulator according to claim 1.

* * * * *